Figure 1:
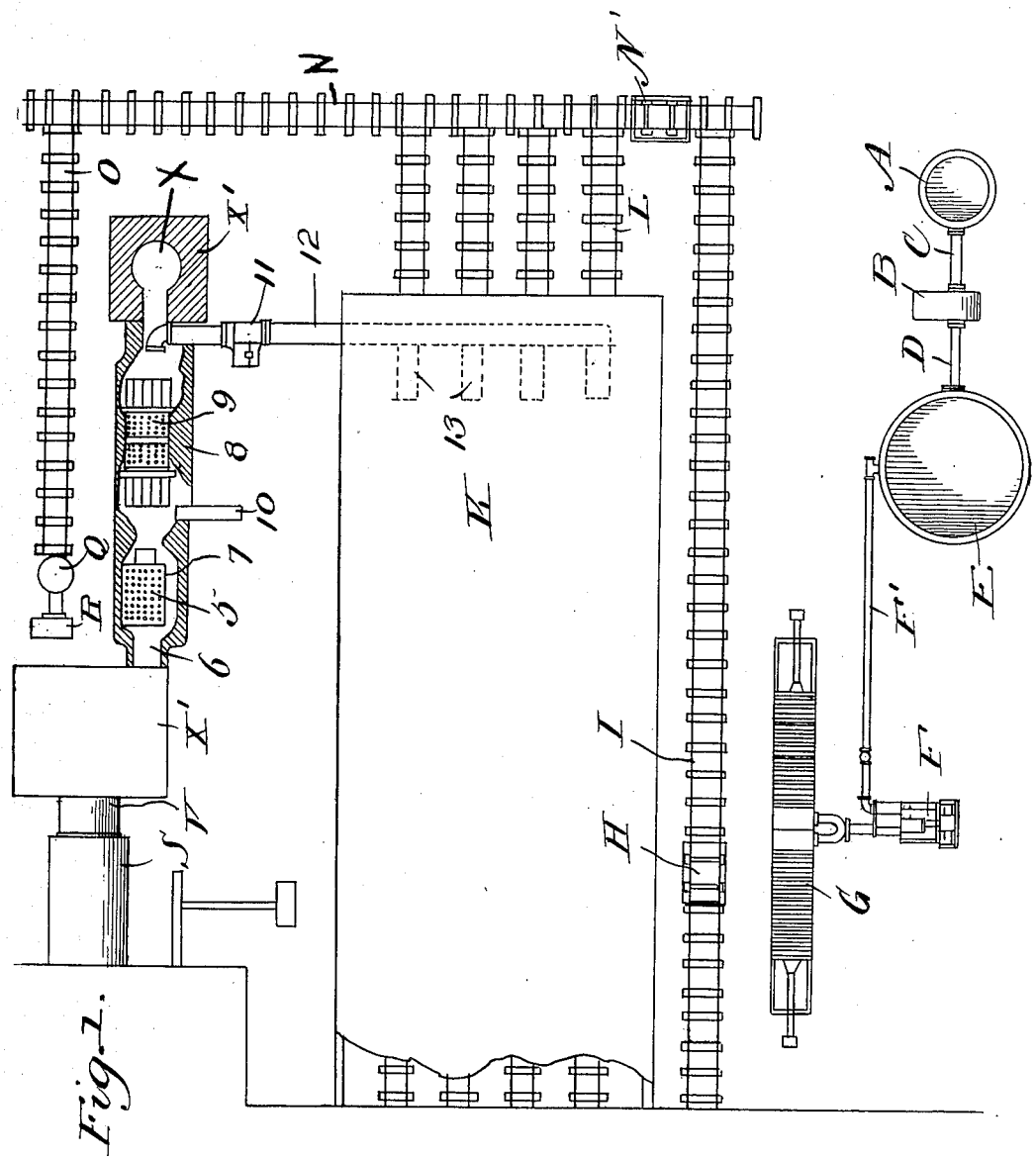

J. G. JONES.
PROCESS FOR RECOVERING WASTE LIME.
APPLICATION FILED JUNE 3, 1907.

916,449. Patented Mar. 30, 1909.
2 SHEETS—SHEET 1.

WITNESSES:

INVENTOR
John G. Jones,
BY
Attorney

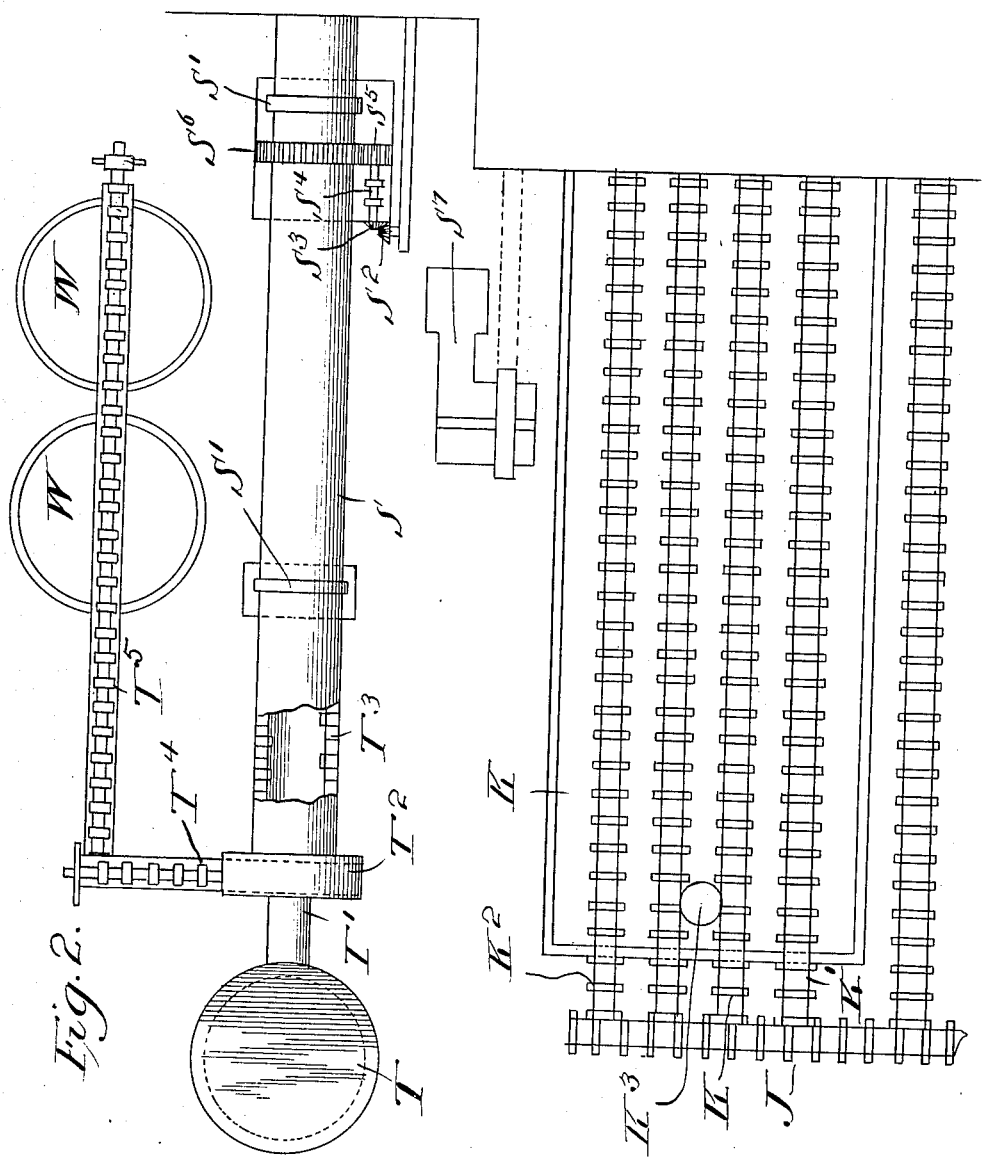

UNITED STATES PATENT OFFICE.

JOHN G. JONES, OF CARTHAGE, NEW YORK.

PROCESS FOR RECOVERING WASTE LIME.

No. 916,449.  Specification of Letters Patent.  Patented March 30, 1909.

Application filed June 3, 1907. Serial No. 377,033.

*To all whom it may concern:*

Be it known that I, JOHN G. JONES, a citizen of the United States, residing at Carthage, in the county of Jefferson and State of New York, have invented certain new and useful Improvements in Processes for Recovering Waste Lime; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful processes of purifying and revivifying spent or waste lime, and consists, first, in separating the impurities from the lime in its carbonate state, after which the lime is relieved of a large percentage of its moisture and, in a plastic state, placed in a drying chamber and subjected to air highly heated by waste $CO_2$ gas issuing from a rotary kiln and given up from the waste carbonate of lime being calcined in the kiln.

More specifically the invention comprises a method of recovering spent limes and, in carrying out the steps of the process, the waste lime is removed of its impurities preferably by centrifugal action, after which the resulting pure carbonate of lime in a semi-liquid form is pumped into an agitator storage tank where it is thoroughly agitated and not allowed to settle. From the agitator, the lime in its semi-liquid form is pumped into a filter press, of any suitable design, and excess of water filtered off under pressure. The lime being formed into cakes in the recesses between the filter plates is removed from the filter press and transferred into a drying kiln where the cakes are thoroughly dried after which the cakes are broken up into small pieces in a suitable crusher and the pieces of a suitable size elevated into storage bins from which the lime is fed into a slowly revolving rotary kiln, the latter being lined throughout with fire resisting brick with part of the brick extended for the purpose of agitating the pieces of lime as they pass slowly through the rotary kiln. Heat at a high temperature is introduced into the discharge end of the rotary kiln, raising the temperature of the fire brick lining of the kiln to an incandescent point and, as the pieces of lime cake are fed into the kiln, they travel slowly forward and absorb the heat both from the highly heated brick lining and the burning gases produced in a gas producer or other heat producing apparatus, whereby the lime material may be gradually raised in temperature until it is made to give off its $CO_2$ in the burning zone and is reduced to the oxid state, in which state it is discharged from the kiln and removed to a storage tank for commercial use.

I illustrate an apparatus whereby the steps of my process may be carried out and, in which illustration, I have shown in Figures 1 and 2 diagrammatic views, which taken together illustrate the complete apparatus.

Reference now being had to the details of the drawings by letters and figures, A designates a separator which may be of any suitable design for separating the impurities from the lime material, preferably by centrifugal action but any other means, of course, may be employed if desired.

B designates a pump for pumping the lime material, free from its impurities, from the separator A through the pipe C and thence through the pipe D into the agitator tank E.

F designates a pump which communicates by means of the pipe F' with the agitator tank E, and provided for the purpose of drawing the lime material in a semi-liquid form from the agitator tank to a filter press G, of any suitable design, in which the excess of water is filtered off under pressure, the lime being formed into cakes in the recesses between the filter plates. The cakes are then removed from the filter press, placed upon a car H traveling upon the track I and conveyed to the track J, which runs at right angles to the track I, and thence the car is run into the kiln K upon one or another of the tracks K', shown clearly in Fig. 2 of the drawings. After the cakes of lime have been thoroughly dried within the drying kiln, the cars containing the cakes are moved out upon one or another of the tracks L leading from the opposite end of the kiln, as shown in Fig. 1 of the drawings, and upon the transfer car N are conveyed upon the track N' to the transfer track O whence the car passes to the crusher Q where the cakes of lime are crushed to a suitable size and raised by the elevator R into bins from which it is conveyed into the rotary kiln S, which is provided with suitable tires S' which rotate upon anti-friction rollers, not shown, said kiln being rotated preferably by the gear wheels S² and S³, which latter through the shaft S⁴ and pinion wheel S⁵ drive the gear wheel S⁶ fixed to the rotary kiln. Said gear mechanism may be driven from any source of supply, as from an engine designated by S⁷. Located adjacent to one end of the rotary kiln is a gas producer T in which coal or other gaseous fuel is reduced to gas which is carried through a flue T' and through the hood T², into the kiln S where it is burned. Said kiln is provided with a brick lining, designated in the drawings by T³, and certain of said brick preferably project beyond others for the purpose of agitating the pieces of lime cake as they slowly travel through the rotary kiln, it being understood that the kiln is disposed preferably at a slight inclination in order that the lime material may be fed by gravity through the same. The burning gas heats up the fire brick lining to a high degree of temperature and the interior of the rotary kiln being heated to the proper point, the crushed lime cake traveling slowly through the kiln will absorb the heat from the burning gas and the heated brick lining until it reaches the burning zone where it gives off its $CO_2$ and becomes reduced to the oxid state. The lime is then discharged from the kiln through the hood T² underneath which is positioned a suitable conveyer T⁴, whereby the lime material is carried to an elevator T⁵, which conveys the material to and discharges the same into the tanks W.

I have found from extensive experimenting that an essential step in my improved process for revivifying spent lime consists in the granulation of the cakes, which have been dried and passing the granules in a carbonate form through the kiln where the calcining takes place. I have also demonstrated that, where the lime to be dried or calcined is of a loose form when it passes into a kiln, it is not possible to successfully burn the same, as it appears to be necessary that the lime when being calcined be in a dense, solid form. To secure the best results, the granules should be of such a size as might conveniently pass through a screen of a one inch mesh, although granules of slightly larger size can be successfully calcined.

The highly heated $CO_2$ gas, which is produced by the calcining of the waste carbonate of lime material, is drawn through the kiln S, thence through the nipple V into the dust separation chamber X, the stack X' being utilized to produce a draft from the dust chamber X, whereby the $CO_2$ gases may be drawn into a water heater 5, preferably of the standard fuel economizer type, through the inlet 6 which communicates between the water heater and the dust chamber. The water contained in the pipes 7 of said heater absorbs a portion of the heat in the $CO_2$ gases, after which the $CO_2$ gases are drawn through an air heater 8, which is composed of a series of air pipes 9, through which pure air is either forced or drawn through the air duct 10 by means of the fan 11, and absorbs heat from the $CO_2$ gases and is then discharged by the fan through the duct 12 into the interior of the drying chamber K through the branching ducts 13, shown in Fig. 1 of the drawings. The heated gases thus being introduced into the drying chamber or kiln come in contact with the cakes in a wet state upon the car and will take up the moisture from the wet cakes, which moisture is drawn out of the drying chamber through the stack A³. The $CO_2$, after having imparted nearly all of its heat, first heating up the lime material as it travels toward the burning zone in the kiln, thence passing through the water in the heater 5, thence through the air in the heater 8, is either discharged to the atmosphere through the stack X' or may be reclaimed in any suitable gas apparatus for commercial use. If it is not desired to use pure air in drying the lime material in the drying kiln, then the highly heated $CO_2$ gas may be introduced direct into the drying kiln after passing through the water heater; or, if desired to dry the lime at a high temperature, the $CO_2$ gas may be introduced direct into the drying kiln as it comes from the dust chamber X.

From the foregoing, it will be noted that the lime which has been reduced to carbonate form, by serving its purpose chemical or otherwise, and which lime, after having served its purpose in the oxid form and reduced to carbonate state and in which carbonate state it has hitherto been considered waste material, may be reclaimed at low cost and again used at commercial value.

While I have described my process as being utilized especially in connection with the reclaiming of waste lime, it will be understood that the same steps may be carried out in preparing and calcining marl, which is usually nearly all pure carbonate of lime, but which in its usual deposit form contains a high percentage of water and, by the treating of the marl in the filter press, drier and rotary kiln, the marl deposits may be utilized by first extracting the water as outlined in my process and then reducing the carbonate of lime in an oxid state in the rotary kiln the same manner as in recovering waste lime.

What I claim is:—

1. The process of purifying and revivifying spent or waste lime consisting in reducing the same to a solid form, afterward drying the carbonate of lime in a solid form, and coarsely granulating the lime and reducing it by heat to an oxid state, as set forth.

2. The process of purifying and revivifying spent or waste lime consisting in reducing the same to a solid form, afterward drying the carbonate of lime in a solid form by air highly heated by $CO_2$ gas, then coarsely granulating the lime and reducing it by heat to an oxid state, as set forth.

3. The process of purifying and revivifying spent or waste lime consisting in first separating impurities therefrom, reducing the lime to a solid form, afterward drying the carbonate of lime in a solid form, then coarsely granulating the lime and reducing it by heat to an oxid state, as set forth.

4. The process of purifying and revivifying spent or waste lime consisting in first separating impurities therefrom, relieving the purified lime of a large percentage of its water, reducing it to a solid form, afterward drying the carbonate of lime in a solid form, then coarsely granulating the same and reducing it by heat to an oxid state, as set forth.

5. The process of purifying and revivifying spent or waste lime consisting in first separating impurities therefrom, relieving the purified lime of a large percentage of its water, reducing it to a solid form, afterward drying the carbonate of lime in a solid form by air highly heated by $CO_2$ gas, then coarsely granulating the lime and reducing it by heat to an oxid state, as set forth.

6. The process of purifying and revivifying spent or waste lime consisting in first separating the impurities therefrom by centrifugal force, reducing the lime to a solid form, afterward drying the carbonate of lime in a solid form, coarsely granulating the same and reducing it by heat to an oxid state, as set forth.

7. The process of purifying and revivifying spent or waste lime consisting in first separating the impurities therefrom by centrifugal force, reducing the lime to a solid form, afterward drying the carbonate of lime in a solid form, by air highly heated by $CO_2$ gas, and then coarsely granulating the lime and reducing it by heat to an oxid state, as set forth.

8. The process of purifying and revivifying spent or waste lime consisting in first separating the impurities therefrom by centrifugal force, relieving the purified lime of a large percentage of its water, reducing the lime to a solid form, afterward drying the carbonate of lime in a solid form by air highly heated by $CO_2$ gas, then coarsely granulating the lime and reducing it by heat to an oxid state, as set forth.

9. The process of purifying and revivifying spent or waste lime consisting in separating the impurities therefrom when in a semi-liquid state, reducing the lime to a solid form, afterward drying the carbonate of lime in a solid form, then coarsely granulating the same and reducing it by heat to an oxid state, as set forth.

10. The process of purifying and revivifying spent or waste lime consisting in separating the impurities therefrom when in a semi-liquid state by centrifugal force, reducing the lime to a solid form, afterward drying the carbonate of lime in a solid form by air highly heated by $CO_2$ gas, and then coarsely granulating the lime and reducing it by heat to an oxid state, as set forth.

11. The process of purifying and revivifying spent or waste lime consisting in separating the impurities therefrom when in a semi-liquid state by centrifugal force, relieving the purified lime of a large percentage of its water, reducing the lime to a solid state, afterward drying the carbonate of lime in a solid form by air highly heated by $CO_2$ gas, then coarsely granulating the lime and reducing it by heat to an oxid state, as set forth.

12. The process of purifying and revivifying spent or waste lime consisting in first separating impurities therefrom, mixing the lime with water, thoroughly agitating the same, afterward relieving the lime of a large percentage of the water, drying the carbonate of lime in a solid form, then coarsely granulating and reducing it by heat to an oxid state, as set forth.

13. The process of purifying and revivifying spent or waste lime consisting in first separating impurities therefrom, reducing the lime to a solid form, drying the same in a solid form by air heated by $CO_2$ gas issuing from a kiln, the temperature of the gas being reduced by its being passed through water and air heaters, then reducing the lime to a coarsely granulated condition, and afterward calcining the latter in a highly heated kiln and reducing it to an oxid state, as set forth.

In testimony whereof I hereunto affix my signature in the presence of two witnesses.

JOHN G. JONES.

Witnesses:
A. T. WOOD,
PETER YONSEY.